US009842376B2

(12) United States Patent
Acharya et al.

(10) Patent No.: US 9,842,376 B2
(45) Date of Patent: Dec. 12, 2017

(54) GRAPHICS PROCESSING UNIT PREEMPTION WITH PIXEL TILE LEVEL GRANULARITY

(71) Applicant: QUALCOMM Incorporated, San Diego, CA (US)

(72) Inventors: Anirudh Rajendra Acharya, San Diego, CA (US); Gang Zhong, San Diego, CA (US); Vineet Goel, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 15/013,714

(22) Filed: Feb. 2, 2016

(65) Prior Publication Data
US 2017/0091895 A1    Mar. 30, 2017

Related U.S. Application Data

(60) Provisional application No. 62/234,355, filed on Sep. 29, 2015.

(51) Int. Cl.
*G06T 1/20* (2006.01)
*G06T 15/80* (2011.01)

(52) U.S. Cl.
CPC .............. *G06T 1/20* (2013.01); *G06T 15/80* (2013.01)

(58) Field of Classification Search
CPC .................................. G06T 1/20; G06T 1/60
See application file for complete search history.

(56) References Cited

U.S. PATENT DOCUMENTS

| 8,139,070 | B1* | 3/2012 | Ostiguy | G06F 9/461 |
| | | | | 345/506 |
| 2013/0117760 | A1* | 5/2013 | Cuadra | G06F 9/3846 |
| | | | | 718/108 |
| 2014/0022263 | A1* | 1/2014 | Hartog | G06T 1/20 |
| | | | | 345/506 |
| 2014/0022266 | A1* | 1/2014 | Metz | G06T 1/20 |
| | | | | 345/522 |
| 2014/0109102 | A1 | 4/2014 | Duncan et al. | |
| 2014/0184617 | A1 | 7/2014 | Palmer et al. | |
| 2015/0070369 | A1 | 3/2015 | Frascati et al. | |
| 2015/0187117 | A1 | 7/2015 | Balci et al. | |
| 2015/0277981 | A1* | 10/2015 | Nalluri | G06T 1/20 |
| | | | | 718/103 |

OTHER PUBLICATIONS

Antonov, "Asynchronous Timewarp Examined," retrieved from https://developer.oculus.com/blog/asynchronous-timewarp-examined/, Mar. 3, 2015, 10 pp.

(Continued)

*Primary Examiner* — Thomas Lett

(57) ABSTRACT

Techniques are described with respect to preemption in which a graphics processing unit (GPU) may execute a first set of commands in response to receiving a draw call, the draw call defining a plurality of primitives that are to be rendered by the first set of commands, receive a preemption notification during execution of the first set of commands, and preempt the execution of the first set of commands, prior to completing the execution of the first set of commands to render the plurality of primitives of the draw call, for executing a second set of commands.

25 Claims, 6 Drawing Sheets

(56) References Cited

OTHER PUBLICATIONS

International Search Report and Written Opinion from International Application No. PCT/US2016/041525, dated Sep. 21, 2016, 13 pp.
Ivan, et al., "Enabling Preemptive Multiprogramning on GPUs", ACM/IEEE 41st International Symposium on Computer Architecture (ISCA), IEEE, Jun. 14, 2014, pp. 193-204, XP032619379, DOI: 10.1109/ISCA.2014.6853208, ISBN: 978-1-4799-4396-8 [retrieved on Jul. 10, 2014], 12 pp.
Response to Written Opinion from corresponding PCT Application Serial No. PCT/US2016/041525 filed on Jul. 24, 2017 (23 pages).
International Preliminary Report on Patentability from corresponding PCT Application Serial No. PCT/US2016/041525 dated Sep. 1, 2017 (29 pages).

* cited by examiner

GRAPHICS PROCESSING UNIT PREEMPTION WITH PIXEL TILE LEVEL GRANULARITY

This application claims the benefit of U.S. Provisional Application No. 62/234,355, filed Sep. 29, 2015 and entitled "GRAPHICS PROCESSING UNIT PREEMPTION," the entire content of which is incorporated herein by reference.

TECHNICAL FIELD

This disclosure relates to graphics processing systems, and more particularly, to graphics processing systems that utilize preemption.

BACKGROUND

Computing devices often utilize a graphics processing unit (GPU) to accelerate the rendering of graphics data for display. Such computing devices may include, e.g., computer workstations, mobile phones such as so-called smartphones, embedded systems, personal computers, tablet computers, and video game consoles. GPUs typically execute a graphics processing pipeline that includes a plurality of processing stages which operate together to execute graphics processing commands. A host central processing unit (CPU) may control the operation of the GPU by issuing one or more graphics processing commands to the GPU. Modern day CPUs are typically capable of concurrently executing multiple applications, each of which may need to utilize the GPU during execution. The arbitration of GPU resources between the different applications that are currently executing on the host CPU can pose a significant challenge to a host CPU, particularly in cases where certain applications may require high priority access to the GPU.

SUMMARY

This disclosure is directed to graphics processing unit (GPU) pixel tile preemption. In some examples, the GPU may context switch from a first set of commands to a second set of commands (e.g., preempt the first set of commands) after rendering a "group" of pixels. For example, the GPU may preempt after rasterizing and shading a pixel group. Also, in some examples, the GPU may pass data from different shaders using normal processing, but may dynamically select how vertex data is streamed out based on preemption. For example, the GPU graphics pipeline is configured generate intermediate data as part of the rendering data and store this intermediate data in local memory of the GPU. However, in response to a command, the GPU dynamically reconfigures the graphics pipeline to output intermediate data to memory external to the GPU.

In one example, the disclosure describes a method of processing data, the method comprising executing, with a graphics processing unit (GPU), a first set of commands via a graphics pipeline of the GPU in response to receiving a draw call, the draw call defining one or more primitives that are to be rendered by execution of the first set of commands, receiving, with the GPU, a preemption notification during execution of the first set of commands and prior to rendering all of the one or more primitives, in response to receiving the preemption notification, disconnecting an output of a local memory of the GPU from a stage of the graphics pipeline and connecting the output of the local memory of the GPU to a hardware stream out unit of the GPU to dynamically configure interconnection of stages of the graphics pipeline during execution of the first set of commands, outputting, from the hardware stream out unit, intermediate data generated during execution of one or more commands of the first set of commands to a memory that is external to the GPU due to the dynamic configuration of the interconnection of stages of the graphics pipeline of the GPU, during execution of the first set of commands, preempting, with the GPU, the execution of the first set of commands, prior to completing the execution of the first set of commands to render the one or more primitives of the draw call, for executing a second set of commands, and executing the second set of commands.

In one example, the disclosure describes a device for processing data, the device comprising a system memory, and a graphics processing unit (GPU). The GPU comprising a hardware stream output unit and a local memory, wherein the GPU is configured to execute a first set of commands via a graphics pipeline of the GPU in response to receiving a draw call, the draw call defining one or more primitives that are to be rendered by execution of the first set of commands, receive a preemption notification during execution of the first set of commands and prior to rendering all of the one or more primitives, in response to receiving the preemption notification, disconnect an output of the local memory of the GPU from a stage of the graphics pipeline and connect the output of the local memory of the GPU to the hardware stream out unit of the GPU to dynamically configure interconnection of stages of the graphics pipeline during execution of the first set of commands, output, from the hardware stream out unit, intermediate data generated during execution of one or more commands of the first set of commands to the system memory that is external to the GPU due to the dynamic configuration of the interconnection of stages of the graphics pipeline of the GPU, during execution of the first set of commands, preempt the execution of the first set of commands, prior to completing the execution of the first set of commands to render the one or more primitives of the draw call, for executing a second set of commands, and execute the second set of commands.

In one example, the disclosure describes a computer-readable storage medium having instructions stored thereon that when executed cause a graphics processing unit (GPU) of a device for processing data to execute a first set of commands via a graphics pipeline of the GPU in response to receiving a draw call, the draw call defining one or more primitives that are to be rendered by execution of the first set of commands, receive a preemption notification during execution of the first set of commands and prior to rendering all of the one or more primitives, in response to receiving the preemption notification, disconnect an output of a local memory of the GPU from a stage of the graphics pipeline and connect the output of the local memory of the GPU to a hardware stream out unit of the GPU to dynamically configure interconnection of stages of the graphics pipeline during execution of the first set of commands, output, from the hardware stream out unit, intermediate data generated during execution of one or more commands of the first set of commands to a memory that is external to the GPU due to the dynamic configuration of the interconnection of stages of the graphics pipeline of the GPU, during execution of the first set of commands, preempt the execution of the first set of commands, prior to completing the execution of the first set of commands to render the one or more primitives of the draw call, for executing a second set of commands, and execute the second set of commands.

In one example, the disclosure describes a device for processing data, the device comprising means for executing a first set of commands via a graphics pipeline of a graphics processing unit (GPU) in response to receiving a draw call, the draw call defining one or more primitives that are to be rendered by execution of the first set of commands, means for receiving a preemption notification during execution of the first set of commands and prior to rendering all of the one or more primitives, means for disconnecting an output of a local memory of the GPU from a stage of the graphics pipeline and connecting the output of the local memory of the GPU to a hardware stream out unit of the GPU to dynamically configure the interconnection of stages of the graphics pipeline during execution of the first set of commands, means for outputting, from the hardware stream out unit, intermediate data generated during execution of one or more commands of the first set of commands to a memory that is external to the GPU due to the dynamic configuration of the interconnection of stages of the graphics pipeline of the GPU, during execution of the first set of commands, means for preempting the execution of the first set of commands, prior to completing the execution of the first set of commands to render the one or more primitives of the draw call, for executing a second set of commands, and means for executing the second set of commands.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
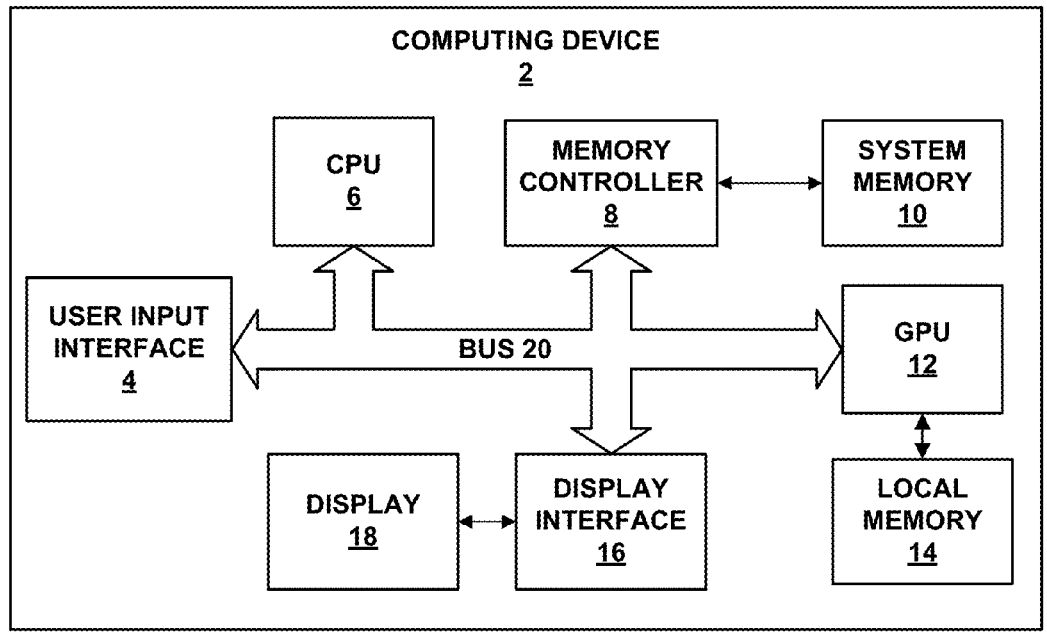
FIG. 1 is a block diagram illustrating an example computing device that may be used to implement the techniques of this disclosure.

This disclosure is directed to preemption techniques for scheduling graphics processing unit (GPU) processes. Preemption refers to having a processor (e.g., GPU) stop execution of a first set of commands for a second set of commands, and then complete the execution of the first set of commands after completing the execution of the second set of commands. For example, a GPU may preempt execution a low-priority set of commands for a higher-priority set of commands.

An example of a relative high priority set of commands is commands for rendering a graphical user interface (GUI). GPUs are increasingly being used for user interface (UI) rendering. UI command streams typically benefit from being serviced in a timely fashion in order to achieve the proper visual effects and responsiveness that users have come to expect in a UI. When a high-priority UI command stream is queued by a host CPU to be executed on a GPU, the GPU may be executing another queued command stream associated with a different context that has a lower priority, such as, e.g., a non-UI graphics context or a context that uses a GPU to perform a general-purpose computing task (i.e., a general-purpose computing on graphics processing unit (GPGPU) task). Waiting for the lower-priority context to complete execution prior to executing the higher-priority UI command stream may not, in some cases, produce an acceptable user experience with respect to the UI.

Lower or low-priority commands and higher or high-priority commands are relative terms used to indicate importance of timely execution of the commands. As an example, commands that should be executed as quickly as possible so as to not interfere with user experience will be of higher-priority compared to commands that if slightly delayed in execution would not greatly diminish user experience. As an example, if the execution of UI commands is delayed, user experience will be negatively impacted because response to user interaction will be delayed. If execution of commands for some matrix operations happening in the background is delayed, there may be little affect on user experience.

There may be other ways in which to qualify commands as higher-priority or lower-priority other than based only on user experience. This disclosure uses the terms higher-priority and lower-priority as relative terms to describe examples of switching from one set of commands to another set of commands. However, the techniques described in this disclosure need not necessarily be limited to examples where switching of commands only occurs for transitioning from low-priority commands to high-priority commands.

Switching from executing a first set of commands to a second set of commands before completion of execution of the first set of commands is referred to as GPU context switching or preemption. Context switching or preemption is useful for hardware acceleration for various GPU workloads like virtualization, UI, graphics/compute apps etc., as well as timely forward progress of various commands. The need for more frequent preemption is arising due to, for example, new use cases, such as virtual reality (time warp, per frame requirements) and automotive use where rendering delays may be undesirable or unacceptable.

One solution to this problem is to allow the host CPU to preempt execution of the lower-priority command stream at arbitrary points and to service a higher-priority command stream whenever the host CPU determines that it is beneficial or desirable to execute the higher-priority command stream first. However, such a solution can be expensive in terms of the overhead (e.g., additional processing time, additional memory bandwidth usage, and/or additional memory usage) needed to perform context switching in the GPU at such arbitrary points in the GPU command stream.

Some GPUs provide for draw call level preemption (e.g., preemption after the issued drawcall is completed). The draw call may define the plurality of primitives that are to be rendered. However, draw call level preemption may be inadequate for certain cases such as for large sized triangles (e.g., for covering one bin or screen). To address such issues, finer grained preemption may be useful. Blind freeze and save-restore (e.g., stopping all functions and storing all state information of all of the stages of the GPU) may be expensive and therefore not an efficient solution.

In general, a vertex shader stage in the GPU is typically fast and is constant for given geometry because the number of vertices is the same regardless of the size of the geometry (e.g., three vertices for a triangle regardless of the size of the triangle). The pixel shader stage in the GPU may be time consuming (e.g., workload varies by resolution independent of geometry). For example, the workload of the vertex shader stage may be the same for different sized triangles, but the workload of the pixel shader stage may be different for different size triangles. For example, long thin triangles have less pixels than long thick triangles, and therefore, workload for long thick triangles is more than that for long thin triangles. As an illustration, assume the coordinates for vertices of a first triangle are (0, 0), (1, 15), and (2, 0). In this example, the first triangle is long (e.g., 15 units in length) but thin (e.g., only 2 units in width). Assume the coordinates for vertices of a second triangle are (0, 0), (10, 15), and (20, 0). In this example, the second triangle is as long as the first triangle (e.g., 15 units in length) but thick (e.g., 20 units in width). There are more pixels in the second triangle than first triangle, and therefore, the workload for the second triangle is more than the first triangle. Also, the resolution may affect the workload for the pixel shader stage. The workload for a long thin triangle in 320×320 resolution may not be as significant as the for 1080p fullHD resolution.

This disclosure describes examples of pixel tile level (granularity) preemption. For example, in normal operation, the vertex shader stage passes data to the pixel shader stage (also referred to as a fragment shader stage). However, when the GPU receives instructions for preemption, the GPU may flush (e.g., complete) all vertex shader stages, but dynamically direct the data to external memory instead. In this way, in some examples, the preemption occurs after execution of the vertex shader stage, but before execution of the pixel shader of draw call. Also, the GPU may determine dynamically whether data from vertex shader stage passes to fragment shader stage via on-chip process or whether the vertex shader stage data is diverted off-chip to external memory. When resuming the preempted context, the data is read from the external memory and fed back into the graphics pipeline.

In the techniques described in this disclosure, the GPU executes a first set of commands via a graphics pipeline of the GPU in response to receiving a draw call (e.g., from a CPU). The draw call defines a plurality of primitives that are to be rendered by the first set of commands, and the graphics pipeline is configured to store data generated during the execution of the first set of commands in local memory of the GPU. Based on need for the GPU to execute a higher priority set of commands (e.g., second set of commands), the GPU may receive a preemption notification (e.g., from the CPU) during execution of the first set of commands and prior to rendering all of the one or more primitives, and in response to receiving the preemption notification, the GPU dynamically configures interconnection of stages the graphics pipeline of the GPU to output intermediate data generated during execution of one or more commands of the first set of commands to a memory that is external to the GPU. The GPU may then preempt the execution of the first set of commands, prior to completing the execution of the first set of commands to render the plurality of primitives of the draw call, for executing a second set of commands (e.g., the higher priority commands relative to the first set of commands).

FIG. 1 is a block diagram illustrating an example computing device 2 that may be used to implement techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile telephone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a CPU 6, a memory controller 8, a system memory 10, a graphics processing unit (GPU) 12, a local memory 14 of GPU 12, a display interface 16, a display 18 and bus 20. User input interface 4, CPU 6, memory controller 8, GPU 12 and display interface 16 may communicate with each other using bus 20. Bus 20 may be any of a variety of bus structures, such as a third generation bus (e.g., a HyperTransport bus or an InfiniBand bus), a second generation bus (e.g., an Advanced Graphics Port bus, a Peripheral Component Interconnect (PCI) Express bus, or an Advanced eXentisible Interface (AXI) bus) or another type of bus or device interconnect. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 6 may comprise a general-purpose or a special-purpose processor that controls operation of computing device 2. A user may provide input to computing device 2 to cause CPU 6 to execute one or more software applications. The software applications that execute on CPU 6 may include, for example, an operating system, a word processor application, an email application, a spread sheet application, a media player application, a video game application, a graphical user interface application or another program. The user may provide input to computing device 2 via one or more input devices (not shown) such as a keyboard, a mouse, a microphone, a touch pad or another input device that is coupled to computing device 2 via user input interface 4.

The software applications that execute on CPU 6 may include one or more graphics rendering instructions that instruct CPU 6 to cause the rendering of graphics data to display 18. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. In order to process the graphics rendering instructions, CPU 6 may issue one or more graphics rendering commands to GPU 12 to cause GPU 12 to perform some or all of the rendering of the graphics data. In some examples, the graphics data to be rendered may include a list of graphics primitives, e.g., points, lines, triangles, quadralaterals, triangle strips, etc.

Memory controller 8 facilitates the transfer of data going into and out of system memory 10. For example, memory controller 8 may receive memory read and write commands, and service such commands with respect to memory 10 in order to provide memory services for the components in computing device 2. Memory controller 8 is communicatively coupled to system memory 10. Although memory controller 8 is illustrated in the example computing device 2 of FIG. 1 as being a processing module that is separate from both CPU 6 and system memory 10, in other examples, some or all of the functionality of memory controller 8 may be implemented on one or both of CPU 6 and system memory 10.

System memory 10 may store program modules and/or instructions that are accessible for execution by CPU 6 and/or data for use by the programs executing on CPU 6. For example, system memory 10 may store user applications and graphics data associated with the applications. System memory 10 may additionally store information for use by and/or generated by other components of computing device 2. For example, system memory 10 may act as a device memory for GPU 12 and may store data to be operated on by GPU 12 as well as data resulting from operations performed by GPU 12. For example, system memory 10 may store any combination of texture buffers, depth buffers, stencil buffers, vertex buffers, frame buffers, or the like. In addition, system memory 10 may store command streams for processing by GPU 12. System memory 10 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media or an optical storage media.

GPU 12 may be configured to perform graphics operations to render one or more graphics primitives to display 18. Thus, when one of the software applications executing on CPU 6 requires graphics processing, CPU 6 may provide graphics commands and graphics data to GPU 12 for rendering to display 18. The graphics commands may include, e.g., drawing commands such as a draw call, GPU state programming commands, memory transfer commands, general-purpose computing commands, kernel execution commands, etc. In some examples, CPU 6 may provide the commands and graphics data to GPU 12 by writing the commands and graphics data to memory 10, which may be accessed by GPU 12. In some examples, GPU 12 may be further configured to perform general-purpose computing for applications executing on CPU 6.

GPU 12 may, in some instances, be built with a highly-parallel structure that provides more efficient processing of vector operations than CPU 6. For example, GPU 12 may include a plurality of processing elements that are configured to operate on multiple vertices or pixels in a parallel manner. The highly parallel nature of GPU 12 may, in some instances, allow GPU 12 to draw graphics images (e.g., GUIs and two-dimensional (2D) and/or three-dimensional (3D) graphics scenes) onto display 18 more quickly than drawing the scenes directly to display 18 using CPU 6. In addition, the highly parallel nature of GPU 12 may allow GPU 12 to process certain types of vector and matrix operations for general-purpose computing applications more quickly than CPU 6.

GPU 12 may, in some instances, be integrated into a motherboard of computing device 2. In other instances, GPU 12 may be present on a graphics card that is installed in a port in the motherboard of computing device 2 or may be otherwise incorporated within a peripheral device configured to interoperate with computing device 2. In further instances, GPU 12 may be located on the same microchip as CPU 6 forming a system on a chip (SoC). GPU 12 may include one or more processors, such as one or more microprocessors, application specific integrated circuits (ASICs), field programmable gate arrays (FPGAs), digital signal processors (DSPs), or other equivalent integrated or discrete logic circuitry.

GPU 12 may be directly coupled to GPU local memory 14. Thus, GPU 12 may read data from and write data to GPU local memory 14 without necessarily using bus 20. In other words, GPU 12 may process data locally using a local storage, instead of off-chip memory. This allows GPU 12 to operate in a more efficient manner by eliminating the need of GPU 12 to read and write data via bus 20, which may experience heavy bus traffic. In some instances, however, GPU 12 may not include a separate cache, but instead utilize system memory 10 via bus 20. GPU local memory 14 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), flash memory, a magnetic data media or an optical storage media.

CPU 6 and/or GPU 12 may store rendered image data in a frame buffer that is allocated within system memory 10. Display interface 16 may retrieve the data from the frame buffer and configure display 18 to display the image represented by the rendered image data. In some examples, display interface 16 may include a digital-to-analog converter (DAC) that is configured to convert the digital values retrieved from the frame buffer into an analog signal consumable by display 18. In other examples, display interface 16 may pass the digital values directly to display 18 for processing. Display 18 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 18 may be integrated within computing device 2. For instance, display 18 may be a screen of a mobile telephone handset or a tablet computer. Alternatively, display 18 may be a stand-alone device coupled to computing device 2 via a wired or wireless communications link. For instance, display 18 may be a computer monitor or flat panel display connected to a personal computer via a cable or wireless link.

The techniques described in this disclosure relate to preemption. In preemption, GPU 12 may pause the execution of one set of commands, execute another set of commands to completion, and then complete execution of the original set of commands. For example, GPU 12 may be executing a set of commands when CPU 6 determines that another set of higher priority commands are to be executed. As an illustration, GPU 12 is executing commands for generating content of a video game when CPU 6 determines that commands for a user interface are to execute first in response to the user interacting with display 18, which may be a touchscreen. In this example, GPU 12 may complete executing commands to generate the user-interface even if completing the execution of the commands for the video game is delayed.

In some cases, GPU 12 may be configured to provide draw call level preemption. For example, preemption may only be allowed at draw call boundaries. In this example, if GPU 12 began executing a draw call, and then receives instructions to preempt, GPU 12 cannot preempt until completion of the execution of the draw call (e.g., complete execution of a pixel shader for rendering of a pixel tile).

However, only having preemption at draw call boundaries may be undesirable for certain cases. For instance, completing the draw call for a "group of primitives" may take a long time (e.g., due to execution of vertex shaders, pixel shaders, other shaders, and all of the functions of fixed function units in response to the draw call) delaying the execution of the higher priority commands. As more examples, single primitive level preemption may also be insufficient, and draw call level preemption may not function well for large sized triangles (for e.g. covering one bin or screen). The draw call may define the plurality of primitives that are to be rendered.

This disclosure describes example techniques for finer grained preemption (e.g., preemption that does not have to occur at draw call boundaries). The example techniques may address the above issues. In some cases, workloads like VR may benefit from a finer granularity of preemption than draw call boundaries to support time-warp (per frame). The techniques described in this disclosure may provide for such finer granularity of preemption.

In some techniques, a blind freeze and save-restore of GPU 12 may be utilized for finer grained preemption (e.g., for in between draw call boundaries). Blind freeze and save-restore means that all states of GPU 12 are immediately frozen at their respective states, and then information indicating their state is stored for later retrieval and restoring of GPU 12. However, blind freeze and save-restore of GPU 12 may be too expensive in terms of processing and power, as well as monopolizing too many resources of GPU 12.

In general, CPU 6 outputs a draw call to have GPU 12 process graphics data, and in response GPU 12 processes the graphics data associated with the draw call. The amount of graphics data associated with a draw call may be variable (e.g., 100s of primitives, 1000s of primitives). To process the graphics data, GPU 12 includes a graphics pipeline (illustrated in more detail in FIG. 4) that includes fixed-function processing stages and programmable processing stages, and each of these stages process received data and output the resulting intermediate data to the next stage for further until GPU 12 outputs the final processed graphics data, thereby forming a pipeline.

Examples of the programmable stages include vertex shaders and pixel shaders (also referred to as fragment shaders). The vertex shader stage is typically not throughput limiting for the graphics pipeline and is constant for geometry. The pixel shader stage may be throughput limiting, as workload typically varies by resolution independent of geometry.

For instance, the vertex shader stage performs operations on vertices of primitives. Regardless of the size of the primitive, there are a set number of vertices on which the vertex shader of the vertex shader stage operates. One example of a primitive is a triangle, and regardless of how large the triangle is, three instantiations of vertex shaders need to execute, each to process one vertex of the triangle. However, the number of instantiations of a pixel shader in the pixel shader stage may be a function of the number of pixels encapsulated by the primitive. For example, one instantiation of the pixel shader executes for each pixel of the primitive. Therefore, from a processing perspective, the throughput of the vertex shader stage may be determinable and relatively constant, but the throughput of the pixel shader stage may be variable, and not necessarily determinable prior to processing.

In one example, GPU 12 may be configured for pixel tile level (granularity) for preemption. For example, GPU 12 may preempt after rendering a "group" of pixels (but not necessarily all of the pixels associated with the draw call). The smallest granularity of a pixel group is usually a "pixel tile" worked upon by the rasterizer of GPU 12. The rasterizer, illustrated in FIG. 4, may be a fixed-function stage of the graphics pipeline of GPU 12. In this example, GPU 12 may preempt (e.g., switch from executing a first set of commands to a second set of commands even if execution of all of the commands of the first set of commands has not completed) after rasterizing and shading a pixel tile (e.g., some of the pixels associated with the draw call, but not necessarily all pixels associated with the draw call). The pixel tile size may be variable based on vendor/family/architecture of GPU 12.

In this disclosure, the examples are described with respect to graphics processing. However, the techniques described in this disclosure are not so limited, and extend to examples where a non-graphics application (e.g., compute shader) executes on GPU 12. The terms draw call and pixel tile should not be considered exclusively limited to graphics applications, and should be considered as covering analogous commands and groups of data for when GPU 12 is executing compute shaders (e.g., non-graphics related to applications such as matrix or vector operation).

As described above, the techniques described in this disclosure allow GPU 12 to preempt without completion of a draw call. To process graphics data, GPU 12 implements a graphics pipeline that includes a vertex shader, rasterizer, and a pixel shader. The graphics pipeline includes additional stages (e.g., domain, tessellation, and hull stages), and the vertex shader, rasterizer, and pixel shader stages are described for purposes of illustration only. The graphics pipeline may conform to the DX11 pipeline or OpenGL pipeline as two examples, but do not necessarily have to conform to any particular pipeline standard.

To complete a draw call, GPU 12 processes the graphics data through the entire graphics pipeline. In one example, one unit (e.g., vertex shader) of the graphics pipeline generates intermediate data, stores the intermediate data in local memory 14 of GPU 12, and the next unit (e.g., rasterizer or pixel shader) in the pipeline retrieves this intermediate data for processing. In another example, the vertex shader always outputs the intermediate data to external memory (e.g., system memory 10).

In the techniques described in this disclosure, if GPU 12 receives an instruction to preempt, then GPU 12 dynamically outputs the intermediate data to system memory 10 so that GPU 12 can preempt without needing to complete the draw call. This dynamic output to system memory 10 is done without instruction from or knowledge of the host processor (e.g., CPU 6). If, however, GPU 12 does not receive an instruction to preempt, the stages of the graphics pipeline of GPU 12 store the graphics data in local memory 14.

As described above, to perform graphics processing, GPU 12 functions on a group of pixels referred to as a pixel tile. A draw call includes processing of one or more primitives, and each primitive may include one or more pixel tiles. In some techniques, GPU 12 would not preempt until all pixel tiles of all primitives associated with the draw call are rendered. In the techniques described in this disclosure, GPU 12 may preempt after rendering a pixel tile of a primitive even if there are more pixel tiles in a primitive that need to be rendered, or more primitives in the draw call that need to be rendered.

Accordingly, the techniques described in this disclosure provide for pixel tile level preemption (e.g., preemption after the processing of a pixel tile), which is finer granularity than draw call preemption (e.g., preemption after processing of a draw call) because a draw call includes one or more primitives, and each primitive includes one or more pixel tiles. Waiting for GPU 12 to complete processing all pixel tiles of all primitives associated with the draw call before preemption may be a much greater time than preempting immediately after completion of execution of a pixel tile.

In the techniques described in this disclosure, the one or more primitives of a draw call include a first set of primitives and a second set of primitives, and GPU 12 may preempt after processing a pixel tile that includes one or more pixels of one or more primitives of the first set of primitives and none of the pixels of the second set of primitives. In techniques that only provide draw call level preemption, GPU 12 would need to process all pixel tiles of both the first set of primitives and the second set of primitives before preempting.

To perform preemption and provide the pixel tile level granularity, GPU 12 may dynamically output intermediate data to system memory 10. To perform such dynamic output of intermediate data, GPU 12 may be configured to dynamically configure the graphics pipeline of GPU 12 so that in response to a preemption notification, GPU 12 outputs the intermediate data generated by the vertex shader stage to system memory 10.

Each of the stages subsequent to the vertex shader stage may complete the processing of the graphics data currently in the graphics pipeline. For instance, since the rasterizer stage of the graphics pipeline functions on pixel tile granularity, the pixel shader may output the final graphics data for pixels of a particular pixel tile being processed. After that, the graphics pipeline may stop execution of the commands for processing pixel tiles of primitives associated with the draw call even if there are more pixel tiles and primitives to be processed.

GPU 12 may then execute another set of instructions (e.g., the higher priority instructions) via the graphics pipeline that is now free to be used for execution. Then, when GPU 12 is to complete the execution of the original set of instructions, GPU 12 reads the intermediate data from system memory 10 and feeds the intermediate data at the graphics pipeline stage subsequent to the stage that generated the intermediate data.

During normal operation, each stage outputs intermediate data to local memory 14 of GPU 12. In the techniques described in this disclosure, in response to a preemption notification, GPU 12 may disconnect an output of the local memory that connects to a stage (e.g., rasterizer stage) of the graphics pipeline, and connect the output of the local memory to a hardware stream out unit that outputs the intermediate data to system memory 10.

As used in this disclosure, the terms "disconnect" and "connect" are used to convey that hardware components are present (e.g., a switch) that allow the intermediate data to be routed in different ways. With the techniques described in this disclosure, stream out hardware of a graphics pipeline can be repurposed for also allowing preemption. This way software like compute shaders and the like do not need to be executed to route the intermediate data in different ways as hardware like switches and a stream out unit can be used additionally for pre-emption in addition to the normal purpose of the stream out hardware.

GPU 12 dynamically configures interconnection of stages of the graphics pipeline during execution of commands. For instance, the rasterizer stage of the graphics pipeline of GPU 12 is normally coupled to pixel shader stage of the graphics pipeline. In some examples, rather than configuring how the stages of the graphics pipeline are interconnected prior to the execution of the commands, GPU 12 may dynamically configure interconnection of stages of the graphics pipeline after execution of the commands has commenced (e.g., after at least one command of the commands has executed, GPU 12 dynamically configures the interconnection of stages).

GPU 12 may output intermediate data generated during execution of one or more commands of the commands to system memory 10 due to the dynamic configuration of the interconnection of stages of the graphics pipeline during execution of the set of commands. In some techniques, GPU 12 may be configured to never output intermediate data to system memory 10 (e.g., never stream out intermediate data). In some techniques, GPU 12 may be configured to always output intermediate data to system memory 10 (e.g., always stream out intermediate data). Some examples allowed for optional streaming out of intermediate data (e.g., optionally outputting intermediate data to system memory 10). However, in such examples of optional streaming out, whether the graphics pipeline of GPU 12 is to output the intermediate data or not output the intermediate data was determined prior to the execution of commands by GPU 12 and set by CPU 6 (e.g., such as in accordance with the OpenGL and Direct X APIs).

In the techniques described in this disclosure, whether GPU 12 outputs the intermediate data is a dynamic determination and made in response to reception of a preemption instructions. CPU 6 may not need to pre-define whether the graphics processing pipeline of GPU 12 is to output the intermediate data to system memory 10 or not output the intermediate data to system memory 10 before GPU 12 beings execution. Rather, GPU 12 may be configured to not output intermediate data to system memory 10, but in response to a preemption notification, dynamically configure interconnection of stages of the graphics pipeline to output the intermediate data to system memory 10 (e.g., disconnect the output of local memory 14 from the rasterizer stage and connect that output of local memory 14 to a hardware stream out unit). From the perspective of CPU 6, there is no change in the graphics pipeline of GPU 12 (i.e., GPU 12 dynamically configures interconnection of stages (e.g., changes what one stage was connected to and connects that stage to a different unit) of the graphics pipeline to output the intermediate data to system memory 10 without any instructions from CPU 6).

Figure 2:
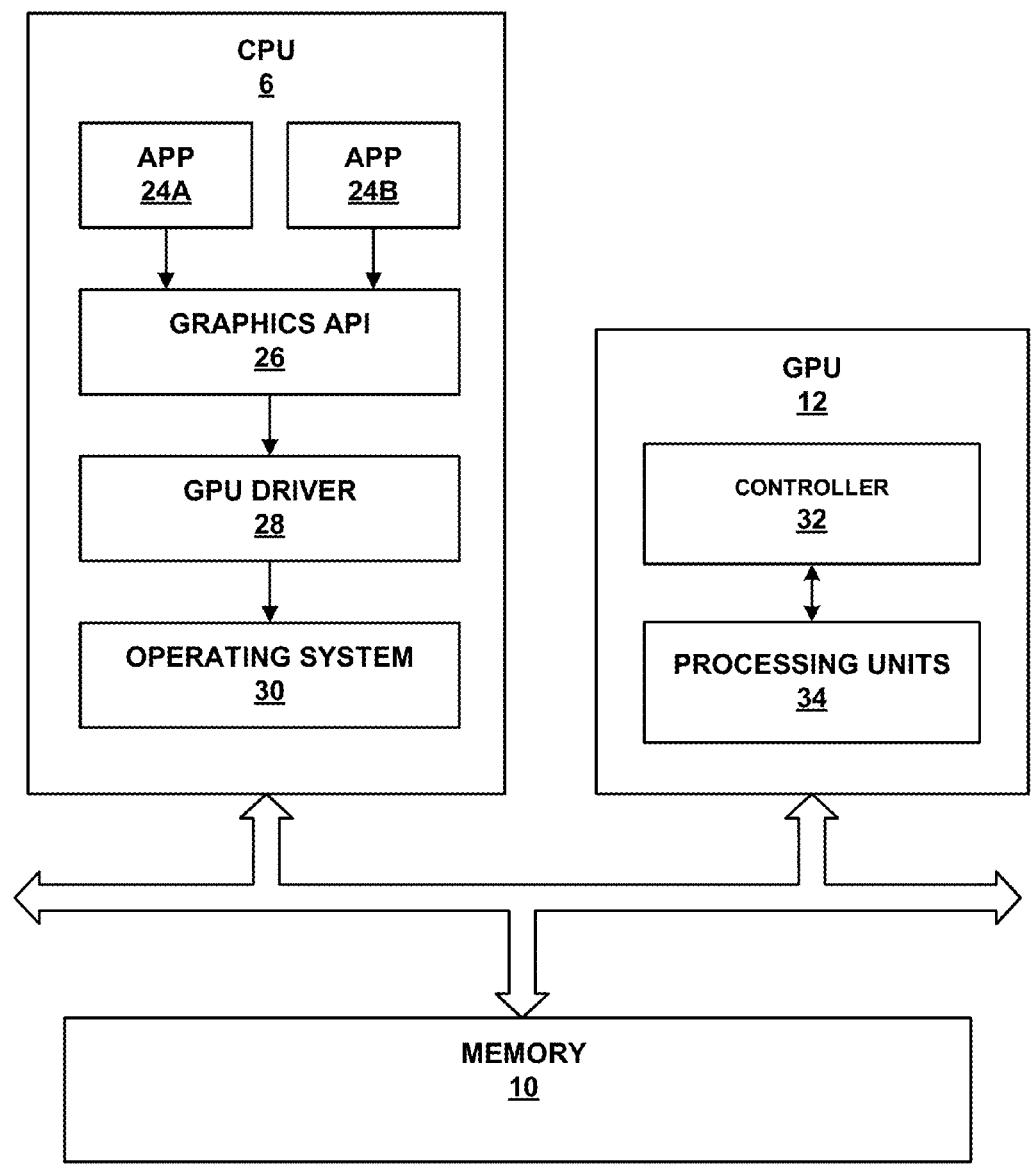
FIG. 2 is a block diagram illustrating the CPU, the GPU and the memory of the computing device of FIG. 1 in further detail.

FIG. 2 is a block diagram illustrating CPU 6, GPU 12 and memory 10 of computing device 2 of FIG. 1 in further detail. As shown in FIG. 2, CPU 6 is communicatively coupled to GPU 12 and memory 10, and GPU 12 is communicatively coupled to CPU 6 and memory 10. GPU 12 may, in some examples, be integrated onto a motherboard with CPU 6. In additional examples, GPU 12 may be implemented on a graphics card that is installed in a port of a motherboard that includes CPU 6. In further examples, GPU 12 may be incorporated within a peripheral device that is configured to interoperate with CPU 6. In additional examples, GPU 12 may be located on the same microchip as CPU 6 forming a system on a chip (SoC). CPU 6 is configured to execute software applications 24A, 24B, a graphics API 26, a GPU driver 28 and an operating system 30. GPU 12 includes a controller 32 and one or more processing units 34.

Software applications 24A, 24B may each include at least one of one or more instructions that cause graphic content to be displayed or one or more instructions that cause a non-graphics task (e.g., a general-purpose computing task) to be performed on GPU 12. Software applications 24A, 24B may issue instructions to graphics API 26. Graphics API 26 may be a runtime service that translates the instructions received from software applications 24A, 24B into a format that is consumable by GPU driver 28.

GPU driver 28 receives the instructions from software applications 24A, 24B, via graphics API 26, and controls the operation of GPU 12 to service the instructions. For example, GPU driver 28 may formulate one or more command streams, place the command streams into memory 10, and instruct GPU 12 to execute command streams. GPU driver 28 may place the command streams into memory 10 and communicate with GPU 12 via operating system 30, e.g., via one or more system calls.

GPU driver 28 may send a preemption notification to GPU controller 32 to indicate that another command stream (e.g., a high-priority command stream) is ready for execution. In some examples, the preemption notification may also indicate to GPU 12 which command stream to execute upon preemption of the command stream currently being executed. GPU driver 28 may send a preemption notification to GPU controller 32, for example, by writing one or more values (e.g., via operating system 30) to one or more GPU registers that are polled by GPU controller 32. The one or more GPU registers may include one or more hardware GPU registers that are located in GPU 12, one or more memory-mapped GPU registers that are located in a memory (e.g., memory 10) or any combination thereof. When writing values to a memory-mapped GPU register, CPU 6 may write the values to one or more particular memory addresses in memory 10 that are polled by GPU controller 32. In some examples, GPU driver 28 may write a first value to one or more GPU registers to activate a preemption notification (including "interrupts" in GPU 12), and write a second value to the one or more GPU registers that identifies the location of the command stream to execute upon preemption of the command stream currently being executed.

Controller 32 is configured to retrieve the commands stored in the command streams, and dispatch the commands for execution on one or more of processing units 34. Controller 32 may dispatch commands from a command stream for execution on all or a subset of processing units 34. In some examples, controller 32 may be configured to poll one or more GPU registers that indicate whether CPU 6 has sent a preemption notification to GPU 12. In cases where the GPU registers are memory-mapped registers, controller 32 may be configured to poll one or more particular memory addresses in memory 10 that indicate whether CPU 6 has sent a preemption notification to GPU 12. In response to the one or more GPU registers indicating that CPU 6 has sent a preemption notification to GPU 12, controller 32 may preempt execution of the GPU command stream that is currently executing and begin to execute another command stream. For example, in the techniques described in this disclosure, controller 32 may configure the graphics pipeline formed by processing units 34 such that in response to the preemption notification, GPU 12 outputs intermediate data generated by processing units of the one or more processing units 34 to system memory 10. In some cases, controller 32 may be configured to determine the command stream to execute upon preemption of the currently executing command stream by reading information stored in the one or more registers of GPU 12 that identifies the command stream to execute upon preemption. For example, CPU 6 may store a pointer in the one or more GPU registers that identifies the memory location of the higher priority command stream.

Controller 32 may be hardware of GPU 12, may be software or firmware executing on GPU 12, or a combination of both. Also, the above description for how controller 32 determines whether an instruction to preempt is received is provided for purposes of illustration only. There may be other ways for CPU 6 to instruct GPU 12 to preempt, and the techniques described in this disclosure are not limited to any specific example.

Processing units 34 may include one or more processing units, each of which may be a programmable processing unit or a fixed function processing unit. The processing units of processing units 34, also referred to as a stages, together form a graphics pipeline configured to perform graphics processing. A programmable processing unit may include, for example, a programmable shader unit that is configured to execute one or more shader programs that are downloaded onto GPU 12 from CPU 6. A shader program, in some examples, may be a compiled version of a program written in a high-level shading language, such as, e.g., an OpenGL Shading Language (GLSL), a High Level Shading Language (HLSL), a C for Graphics (Cg) shading language, etc. In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units in processing units 34 may include, for example, vertex shader stages, pixel shader stages, geometry shader stages, hull shader stages, domain shader stages, compute shader stages, and/or unified shader stages.

A fixed function processing unit may include hardware that is hard-wired to perform certain functions. Although the fixed function hardware may be configurable, via one or more control signals for example, to perform different functions, the fixed function hardware typically does not include a program memory that is capable of receiving user-compiled programs. In some examples, the fixed function processing units in processing units 34 may include, for example, processing units that perform raster operations, such as, e.g., depth testing, scissors testing, alpha blending, etc.

In the example graphics processing system of FIG. 2, memory 10 includes two command streams, each command stream being associated with a different graphics application context (i.e., a different one of software applications 24A, 24B). For example, a first command stream is associated with a graphics application context for software application 24A, and a second command stream is associated with a graphics application context for software application 24B. For ease of illustration, two GPU command streams are described as being stored in memory 10 of the example graphics processing system of FIG. 2. In other examples, however, the same or a different number of GPU command streams may be used that are stored in the same or different components of a graphics processing system.

In the above example, the two streams between which GPU 12 switches are command streams from two different applications 24A, 24B. However, the examples described in this disclosure are not so limited. In some examples, GPU 12 may switch between command streams of the same application if needed (e.g., a high priority stream of application 24A preempts a low priority stream of application 24A). The command streams described in this disclosure should not be considered limited to being for different applications, and may be for the same application.

GPU driver 28 of CPU 6 may be configured to write the command streams to memory 10, and controller 32 of GPU 12 may be configured to read the one or more commands of command streams from memory 10. In some examples, one or both of command streams may be stored as a ring buffer in memory 10. A ring buffer may be a buffer with a circular addressing scheme where CPU 6 and GPU 12 maintain synchronized state variables associated with the writing of data to and reading of data from the ring buffer. For example, if the first command stream is a ring buffer, each of CPU 6 and GPU 12 may store a write pointer indicating the next address to be written to in the ring buffer, and a read pointer indicating the next address to be read from in the ring buffer. When CPU 6 writes a new command to the ring buffer, CPU 6 may update the write pointer in CPU 6 and instruct GPU 12 to update the write pointer in GPU 12. Similarly, when GPU 12 reads a new command from the ring buffer, GPU 12 may update the read pointer in GPU 12 and instruct CPU 6 to update the read pointer in CPU 6. Other synchronization mechanisms are possible. When the read and/or write pointers reach a highest address in the range of addresses allocated for the ring buffer, the read and/or write pointers may wrap around to the lowest address to implement a circular addressing scheme.

Example operation of an example GPU driver 28 and an example GPU controller 32 designed in accordance with this disclosure will now be described with respect to FIG. 2. In this example, software application 24B has a higher scheduling priority than the scheduling priority of software application 24A. In particular, in this example, software application 24B is a user interface (UI) software application that includes one or more instructions that cause graphic content to be displayed and that demands high priority access to GPU 12 to ensure timely updates of the UI. Meanwhile, in this example, software application 24A is a lower-priority application that includes one or more instructions that cause graphic content to be displayed and/or one or more instructions that cause a non-graphics task (e.g., a GPGPU computing task) to be performed on GPU 12.

GPU driver 28 receives one or more instructions from software application 24A that specify graphics operations and/or general-purpose computing operations to be performed by GPU 12. GPU driver 28 places the output command stream into memory 10, which is accessible by GPU controller 32. GPU driver 28 notifies GPU controller 32 that the command stream corresponding to software application 24A is available for processing. For example, GPU driver 28 may write to a GPU register (e.g., a GPU hardware register polled by GPU 12 and/or a GPU memory-mapped register polled by GPU 12) one or more values indicating that the command stream is ready for execution.

Upon notification that the command stream is ready for execution, controller 32 of GPU 12 may determine if resources are currently available on GPU 12 to begin executing the command stream. If resources are available, controller 32 begins to dispatch the commands in the command stream. Meanwhile, GPU driver 28 receives one or more instructions from UI software application 24B that specify high-priority graphics operations to be performed by GPU 12. GPU driver 28 generates a high-priority command stream to carry out the operations specified by the received instructions, and places the resulting command stream into memory 10.

GPU driver 28 provides a preemption notification to controller 32 indicating that the high-priority command stream is ready for processing and that this command stream should preempt any other lower-priority command streams that are executing on GPU 12. In some examples, GPU driver 28 may provide the preemption notification (e.g., preemption instruction or command) to GPU 12 by writing to a GPU hardware register that is polled by the GPU 12 and/or by writing to a memory-mapped register (e.g., a particular location in memory 10) that is polled by GPU 12.

In some cases, GPU driver 28 or CPU 6 may define preemption levels for different applications or commands of the same application. For example, a first stream has higher priority than a second stream, but lower priority than a third stream. In this example, if the second stream is executing, GPU driver 28 may cause GPU 12 to preempt the second stream with either the first stream or the third stream. However, if the first stream is executing, then only the third stream may preempt, and no stream may preempt the third stream. This example may be extended to "n" streams and there may be other factors for which streams can preempt with other streams.

In the techniques described in this disclosure, GPU 12 may support pixel tile level preemption. For example, GPU 12 may use on-chip data passing for "normal" processing, and dynamically choose to stream out vertex output based on preemption by dynamically configuring the way in which stages of the graphics pipeline are interconnected. As an example, GPU 12 may use external memory, such as memory 10 (e.g., memory that requires bus 20 for communication), for data storage for primitives in pipeline on "preemption," and may stop pixel (tile) generation. GPU 12 may flush all vertex stages, but dynamically direct them to external memory instead. Controller 32, some other hardware or software component of GPU 12, or controller 32 and other components of GPU 12 may perform this dynamic direction to memory 10. On resume, controller 32 or some other hardware or software component of GPU 12, or controller 32 and other components of GPU 12 may feed post transform vertex attributes to pixel pipeline.

In some examples, the post transform vertex attributes are fed to the pixel shader stage. However, in general, on resume, controller 32 or some other hardware or software component of GPU 12, or controller 32 and other components of GPU 12 may feed post transform vertex attributes to a pre-pixel shader stage output such as vertex shader stage, domain shader stage, geometry shader stage, or other shader stages. The stage where the resuming of the process happens may be at one of the stages of GPU 12 and the techniques described in this disclosure should not be considered limited to any particular stage of GPU 12 where resumption of the preempted process begins.

As an example, the graphics pipeline formed by processing units 34 may perform graphics processing in a pipeline fashion where one unit (or stage) generates intermediate data that the next stage receives and processes further. During normal operation, each stage outputs generated intermediate data to local memory 14 of GPU 12 (e.g., cache; however, other examples such as registers or buffers are also possible as local memory 14). The next stage then reads the intermediate data from the local memory for further processing.

However, in the event that CPU 6 outputs a preemption notification, controller 32 may be configured to change the configuration of the graphics pipeline formed by processing units 34. As an example, controller 32 may disconnect the stage of the graphics pipeline that receives intermediate data from the local memory and connect the output of the local memory to a hardware stream out unit that outputs the intermediate data to system memory 10. Controller 32 may be configured to dynamically stream out (e.g., output to system memory 10) intermediate data in response to a preemption notification.

In some examples, the graphics pipeline formed by processing units 34 may be configured, prior to execution of commands, to either stream out the intermediate data to system memory 10 or not stream the intermediate data to system memory 10. In the techniques described in this disclosure, by dynamically configuring the graphics pipeline during execution of commands (e.g., in response to a pre-emption notification), GPU 12 may be able to more quickly perform preemption.

For example, GPU 12 may be configured to output intermediate data (e.g., data generated mid-process of rendering one or more primitives) to system memory 10, which means that after the intermediate data is written to system memory 10, processing units 34 are ready for executing the higher priority commands. Processing units 34 do not need to wait until all primitives of a draw call are processed before executing the higher priority commands.

As noted above, disconnect and connect are used in this disclosure to mean that there is a hardware components specifically designed to route the intermediate data. For instance, a stream out unit may be a hardware unit with fixed functions (e.g., not programmable). The fixed functions of the stream out unit may be to route the intermediate data and GPU 12 may disconnect output of a local memory and connect the output of the local memory to the stream out unit to physically, rather than programmatically (functionally), change the graphics pipeline. In some examples, software, like compute shaders, need not be executed to route intermediate data because the techniques leverage stream out functionality for pre-emption purposes allowing for fast pre-emption.

Figure 3A:
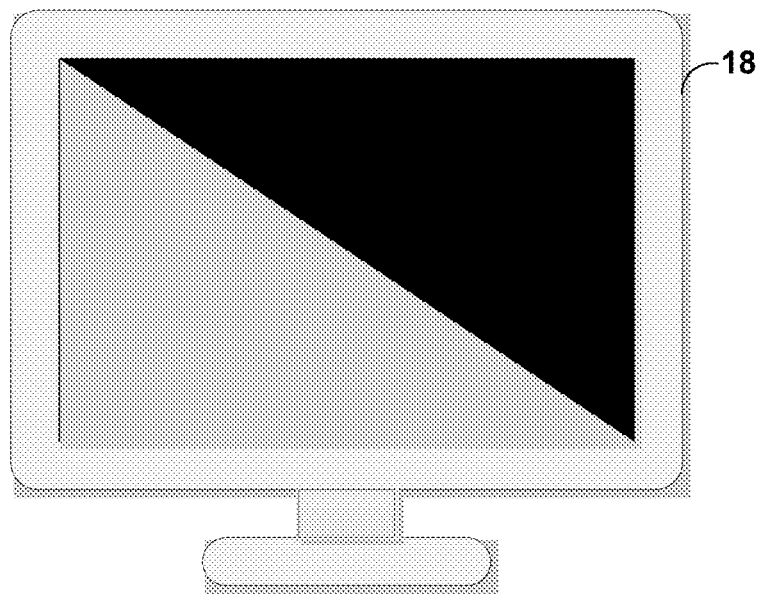
FIG. 3A is a conceptual diagram illustrating pixels of a display.
Figure 3B:
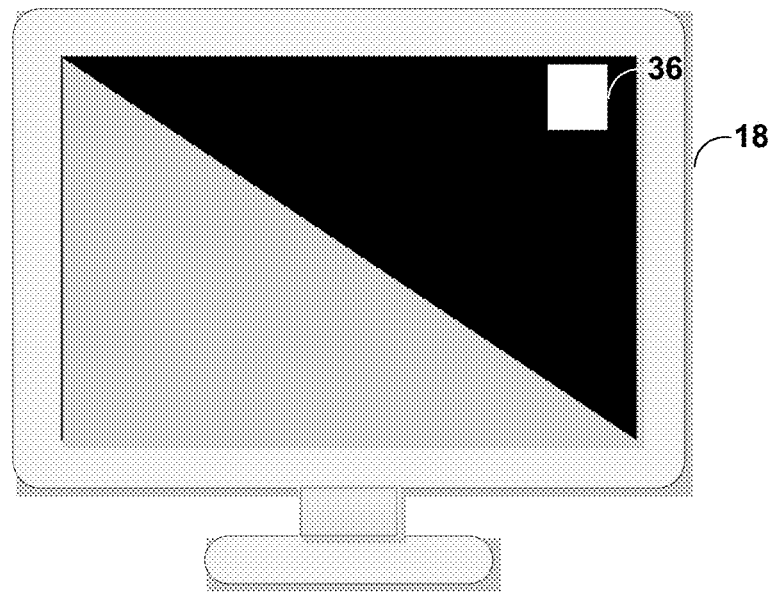
FIG. 3B is a conceptual diagram illustrating a pixel tile.

FIG. 3A is a conceptual diagram illustrating pixels of display 18. FIG. 3B is a conceptual diagram illustrating pixel tile 36 on display 18. In FIG. 3A, there are two primitives (e.g., two triangles formed by a diagonal line across display 18). Pixel tile 36 is an example of the smallest granularity of pixel group that the rasterizer of GPU 12 works upon. As illustrated, pixel tile 36 is located in the top-right corner of display 18, but other locations are possible. Also, pixel tile 36 is illustrated as being 4×3 (e.g., there are four pixels across and three pixels down in pixel tile 36), but other sizes are possible and generally based on the vendor, family, and/or architecture of GPU 12.

Assume that pixel tile 36 is being processed, in the techniques described in this disclosure, GPU 12 may be able to preempt execution of a lower priority set of commands with a higher priority set of commands after GPU 12 processes pixel tile 36. For instance, after GPU 12 generates and stores the pixel values of the pixels of pixel tile 36 and all other intermediate data is streamed out to system memory 10, GPU 12 may switch to executing the higher priority commands.

In some techniques, GPU 12 may have needed to wait not only until pixel values for all pixels of the primitive that includes pixel tile 36 are generated, but also until pixel values for all pixels of the other primitive (e.g., the primitive that does not include pixel tile 36) are generated. GPU 12 would have needed to wait until the completion of the draw call (e.g., until GPU 12 reached a draw call boundary). A draw call boundary is the end of the draw call (e.g., after pixel values are generated and stored for the last pixel of the last primitive of the draw call).

With the pixel tile level granularity of preemption, the delay in preemption is reduced. For instance, in FIG. 3B, assume that a first set of primitives includes the top primitive that includes pixel tile 36, and that a second set of primitives includes the bottom primitive. In this example, the preempting includes preempting after rasterization and shading of pixels of pixel tile 36 (e.g., after GPU 12 generates pixel values for pixels of pixel tile 36) and no other subsequent tile (e.g., no tile after pixel tile 36 is processed before preemption occurs). For instance, although both the primitives in FIG. 3B may have been part of the draw call, preemption occurs after generating pixel values for pixel tile 36 where pixel tile 36 includes one or more pixels of one or more primitives of the first set of primitives (e.g., top primitive) and none of the pixels of the second set of primitives (e.g., bottom primitive).

Figure 4:
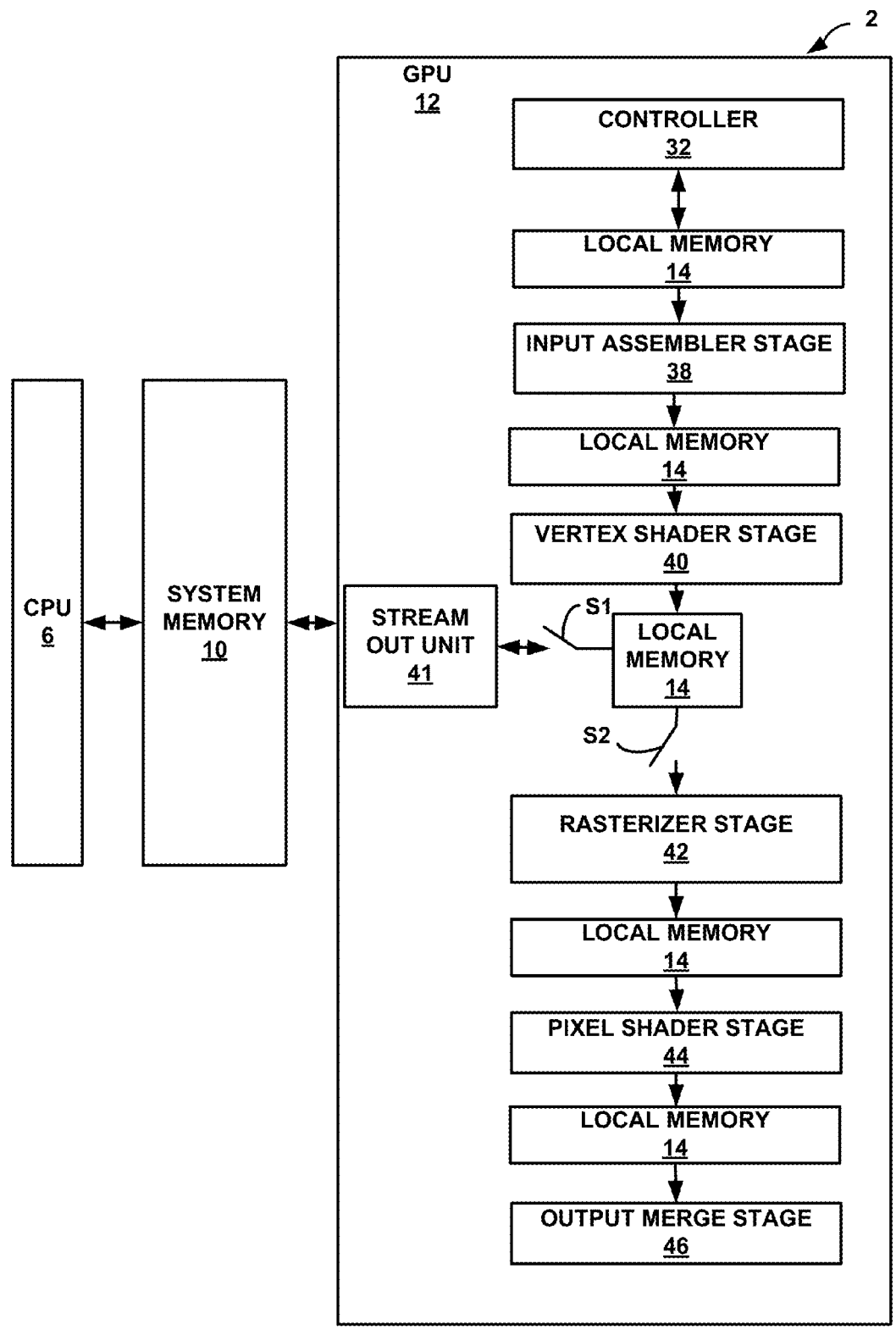
FIG. 4 is a block diagram illustrating an example of a graphics processing unit (GPU) that may implement an example of a graphics processing pipeline in accordance with one or more examples described in this disclosure.

FIG. 4 is a block diagram illustrating an example of a graphics processing unit (GPU) that may implement an example of a graphics processing pipeline in accordance with one or more examples described in this disclosure. To perform graphics operations, GPU 12 may implement a graphics processing pipeline. The graphics processing pipeline includes performing functions as defined by software or firmware executing on GPU 12 and performing functions by fixed-function units that are hardwired to perform very specific functions. The software or firmware executing on the GPU 12 may be referred to as shaders, and the shaders may execute on one or more shader cores of GPU 12. Shaders provide users with functional flexibility because a user can design the shaders to perform desired tasks in any conceivable manner. The fixed-function units, however, are hardwired for the manner in which the fixed-function units perform tasks. Accordingly, the fixed-function units may not provide much functional flexibility.

In this example, GPU 12 may include one or more of input assembler stage 38, vertex shader stage 40, rasterizer stage 42, pixel shader stage 44, and output merge stage 46. GPU 12 may include addition stages such a hull shader stage, tessellation stage, domain shader stage that following the vertex shader stage in that order. GPU 12 may also include a geometry shader stage that is coupled to the output to domain shader stage, if GPU includes a domain shader stage, or the output of the vertex shader stage 40, if no domain shader stage. Rasterizer stage 42 may receive graphics data from vertex shader stage 40, as illustrated, or from geometry shader stage (when available) or domain shader stage (when available).

Other configurations of the graphics pipeline are possible, and the techniques descried in this disclosure should not be considered limited to the specific example illustrated in FIG. 4. For example, GPU 12 may include more stages than those illustrated, and in some examples, GPU 12 may not necessarily include all of the illustrated stages. Also, the specific ordering of the stages is provided for purposes of illustration and should not be considered limiting.

Input assembler stage 38 may read vertex points of vertices from system memory 10 as defined by CPU 6, and assemble the control points to form the vertices. For instance, input assembler stage 38 may read the coordinates, color values, and other such information. The coordinates, color values, and other such information may be commonly referred to as attributes of the vertices. Based on the attributes of the vertices, input assembler stage 38 may determine the general layout of the primitives. In this manner, input assembler stage 38 may assemble the control points to form the patch. Input assembler stage 38 may be a fixed-function unit.

Vertex shader stage 40 may process the vertices from input assembler stage 38. For example, vertex shader stage 40 may perform per-vertex operations such as transformations, skinning, morphing, and per-vertex lighting. Vertex shader stage 40 may be a shader.

Rasterizer stage 42 receives the primitives from vertex shader stage 40 and converts the primitives into pixels for the display. For example, the primitives may be defined as vectors that indicate the interconnection of the primitives, and may be defined in a coordinate space that is independent of the display on which the image is to be displayed.

Rasterizer stage 42 converts these vectors into the display coordinates, and performs any additional functions such as removing points within primitives that are occluded.

Pixel shader stage 44 receives the pixels as outputted by rasterizer stage 42 and performs post processing to assign color values to each of the pixels that are to be displayed. For example, pixel shader stage 44 may receive constant values stored in system memory 10, texture data stored in system memory 10, and any other data to generate per-pixel outputs such as color values. Pixel shader stage 44 may also output opacity values that indicate the opaqueness of the pixels.

Output merge stage 46 may perform any final pixel processing. For example, output merge stage 46 may utilize depth information to further determine whether any of the pixels should be removed from being displayed. Output merge stage 46 may also perform blending operations to generate final pixel values. Output merge stage 46 may output the final pixel values to a frame buffer, generally located within system memory 10, but which may be located within GPU 12.

In the example illustrated in FIG. 4, each one of the stages receives data from and outputs data to local memory 14 of GPU 12). Other examples of local memory exist in addition to or instead of local memory 14. As one example, the stages may output data to and receive data from general purpose registers (GPRs). Unlike local memory 14, each of the GPRs may be configured to receive from and output to specific stages, rather than being memory for each of the stage. GPRs are another example of local memory of GPU 12.

Local memory 14 of GPU 12 receives intermediate data generated by respective stages and outputs the intermediate data to the next stage for further processing. For example, input assembler stage 38 receives graphics data from local memory 14, performs graphics processing on the graphics data and generates first intermediate data that input assembler stage 38 stores in local memory 14. Vertex shader stage 40 receives this first intermediate data from local memory 14, performs graphics processing on this retrieved intermediate data and generates second intermediate data.

In normal operation (e.g., when there is no preemption notification), rasterizer stage 42 receives this second intermediate data from local memory 14, performs graphics processing on the second intermediate data and generates third intermediate data that rasterizer stage 42 stores in local memory 14. Output merge stage 46 receives the third intermediate data from local memory 14, performs graphics procession on the third intermediate data and generates the final pixel values that output merge stage 46 stores in system memory 10 or possibly within local memory 14 (or a combination of both).

In examples where there are more stages between vertex shader stage 40 and rasterizer stage 42, there may be more connections to local memory 14 for these in between stages (e.g., one or more of hull shader stage, domain shader stage, and geometry shader stage). The various stages from vertex shader stage 40 through, but not including rasterizer stage 42, may be commonly referred to as geometry pipeline. In the techniques described in disclosure, in response to a preemption notification, controller 32 may configure the illustrated pipeline so that the output of the geometry pipeline (e.g., vertex shader stage 40 in this example in FIG. 4) is streamed out (e.g., outputted) to system memory 10.

As illustrated, GPU 12 includes stream out unit 41 which is a hardware unit of GPU 12. Stream out unit 41 may be configured to receive data from local memory 14, and more particularly, data generated by the geometry pipeline, and output that data to system memory 10. Stream out unit 41 may also be configured in the reverse to receive data from system memory 10 and store the data in local memory 14 (e.g., after the preemption is complete and the original instructions are to execute). Accordingly, stream out unit 41 provides a specialized way for GPU 12 to output intermediate data (e.g., data generated by the geometry pipeline) to system memory 10 and to retrieve this intermediate data from system memory 10.

In some techniques, stream out unit 41 is used for a specific purpose which is to receive intermediate data. However, in these techniques, whether stream out unit 41 outputted the intermediate data to system memory 10 may need to be determined prior to any execution. For instance, if stream out unit 41 is to output the intermediate data, the graphics pipeline of GPU 12 is in a first configuration, and if stream out unit 41 is not to output the intermediate data, the graphics pipeline of GPU 12 is an a second configuration. Whether the graphics pipeline is in the first configuration or the second configuration, GPU 12 may need to set the configuration prior to execution of the commands.

However, in the techniques described in this disclosure, controller 32 may dynamically configure the interconnection of stages of the graphics pipeline so that during the execution of the commands, controller 32 can configure the graphics pipeline in the first configuration or the second configuration. For instance, in response to a preemption notification, controller 32 may disconnect the output of local memory 14 that connects to rasterizer stage 42 and connect the output of local memory 14 to stream out unit 41. For example, GPU 12 may execute a first set of commands via the graphics pipeline illustrated in FIG. 4 in response to receiving a draw call. The draw call defines one or more primitives that are to be rendered by the first set commands. As illustrated, the graphics pipeline is configured to store data generated by stages of the graphics pipeline during execution of the first set of command in local memory 14 of GPU 12.

Controller 32 may then receive a preemption notification during the execution of the first set of commands. In response to receiving the preemption notification, controller 32 may disconnect an output of the local memory 14 of GPU 12 from a stage of the graphics pipeline (e.g., rasterizer stage 42) and connect the output of the local memory to hardware stream out unit 41 for outputting intermediate data generated during execution of one or more commands of the first set of commands (e.g., intermediate data generated by vertex shader stage 40 or the geometry pipeline, more generally) to a memory that is external to GPU 12 (e.g., system memory 10) to dynamically configure interconnection of stages of the graphics pipeline of GPU 12, during execution of the first set of commands. GPU 12 may output the intermediate data to the memory that is external to GPU 12 (e.g., system memory 10) due to the dynamic configuration of the interconnection of stages of the graphics pipeline. Accordingly, controller 32 may leverage hardware capabilities of GPU 12 to perform preemption rather than relying on software, like compute shaders, to perform preemption at pixel tile level granularity.

In normal operation, controller 32 may keep switch S2 closed and switch S1 open so that rasterizer stage 42 receives the intermediate data generated by the geometry pipeline (e.g., vertex shader stage 40 in this example). For example, rasterizer stage 42 may receive intermediate data from the local memory for processing by rasterizer stage 42 prior to receiving the preemption notification. Then, in response to the preemption notification, controller 32 may open switch S2 and close switch S1 so that any data that the geometry pipeline generates streams out to system memory 10 via stream out unit 41. In this way, controller 32 dynamically configures interconnection of stages of the graphics pipeline (e.g., the existing connection between geometry pipeline and the next stage is broken and geometry pipeline now outputs to a different stage). In FIG. 4, controller 32 may configure the graphics pipeline such that only in response to receiving the preemption notification, stream out unit 41 outputs the intermediate data generated by a shader (e.g., last shader in the geometry pipeline such as vertex shader stage 40 in FIG. 4) to the memory that is external to GPU 12 (e.g., system memory 10). Stream out unit 41 is configured to output the intermediate data to system memory 10 due to the dynamic configuration of the interconnection of stages of the graphics pipeline.

Controller 32 may then stop execution of the first set of commands for rendering the one or more primitives, and allow a second set of commands to execute via the graphics pipeline. In this way, controller 32 may preempt the execution of the first set of commands, prior to completing the execution of the first set of commands to render the one or more primitives of the draw call, for executing a second set of commands. Subsequent to the execution of the second set of commands, controller 32 may cause GPU 12 to resume execution of the first set of commands.

In this disclosure, GPU 12 reaches a draw call boundary when all primitives of draw call are rendered. Because GPU 12 is able to preempt prior to completing execution of the first set of commands to render the one or more primitives of the draw call, GPU 12 preempts prior to draw call boundaries.

In some examples, in preempting prior to draw call boundaries, GPU 12 may be configured to preempt mid-primitive. As described, GPU 12 provides pixel tile level granularity for preemption. For instance, during execution, rasterizer stage 42 retrieves intermediate data from local memory 14 for one or more pixels of a pixel tile. A pixel tile includes one or more pixels of a primitive, and is generally smaller than a primitive.

After controller 32 opens switch S2, rasterizer stage 42 is unable to retrieve any more intermediate data. Accordingly, rasterizer stage 42 may complete processing the current pixel tile, pixel shader stage 44 may process pixels of the current pixel tile, and output merge stage 46 may process pixels of the current pixel tile. Then, each of these stages may be considered as being flushed (i.e., currently processing no data) and are able to operate on the second set of commands (e.g., the higher priority commands for which the first set of commands were preempted). In this example, preempting includes preempting after rasterizing and shading a pixel tile (e.g., after rasterizer stage 42 and pixel shader stage 44 perform respective functions on a pixel tile) and no other subsequent pixel tile even if there are more tiles in a primitive of the draw call that need to be processed. In this way, GPU 12 provides for a mechanism to preempt after completing the processing of a current pixel tile if there are more pixel tiles in the primitive (e.g., provides for a mechanism for pixel tile granularity for preemption).

For the components that are before rasterizer stage 42 in the graphics pipeline, any data these stages generate after receiving the preemption notification streams out to system memory 10 via stream out unit 41. For example, controller 32 may allow vertex shader stage 40 (and any other stages in the geometry pipeline) to complete the processing of any data these stages and output the resulting intermediate data to system memory 10. In this way, controller 32 flushes the stages in the geometry pipeline.

In addition to flushing stages of the geometry pipeline and the stages after and including rasterizer stage 42, controller 32 may stop the execution of the commands of the first set of commands. For example, controller 32 may stop input assembler stage 38 from assembling any more primitives and stop issuing commands of the first set of commands to vertex shader stage 40. If there is any remaining data for the one or more primitives of the draw call that was never outputted, controller 32 may store context values for that data in system memory 10 for after completion of the execution of the second set of commands, when the first set of commands are to complete execution.

Context values refer to values that GPU 12 can use to determine how to resume execution of the commands after preemption. Examples of the context values includes location information, attribute information, command stream information (e.g., at which command the preemption occurred), state information of the GPU (e.g., position of flip-flops), values within registers, and the like that GPU 12 can use to place itself in the same state that GPU 12 was in when GPU 12 preempted execution of the first set of commands. In this disclosure, rather than storing all of the context values for all of the primitives in response to a draw call, which may require a large amount of memory, GPU 12 may store a limited amount of context values (e.g., only for those primitives with intermediate data that was not outputted).

For example, in response to the preemption notification, controller 32 opens switch S2 and closes switch S1 to stream out intermediate data, and allows all stages to complete execution of any commands of the first set of commands that are currently being executed at the time the preemption notification was received. Controller 32 then allows the second set of commands to execute all the way to completion (i.e., controller 32 allows the last command of the second set of commands to complete).

Subsequent to the execution of the second set of commands, controller 32 resumes execution of the first set of commands by retrieving the intermediate data from system memory 10 for rasterizing and pixel shading. For example, to complete the execution of the first set of commands, controller 32 closes switch S1 and closes switch S2. Stream out unit 41 reads in the intermediate data from system memory 10 that was stored in system memory 10 in response to the preemption notification, and rasterizer stage 42 now rasterizes this intermediate data and pixel shader stage 44 applies pixel shading to the data generated by rasterizer stage 42. In addition, input assembler stage 38 assembles primitives of the draw call, based on the stored context values that may not have been assembled when the preemption notification was received. Vertex shader stage 40 then processes these primitives and the graphics pipeline functions as normal (e.g., controller 32 configures the graphics pipeline to its normal state where intermediate data is stored locally instead of in system memory 10).

To further assist with understanding, the following describes example techniques of this disclosure for a case where GPU 12 receives a draw call from CPU 6 to render 10 primitives. This example is provided for ease of description and should not be construed as limiting.

In response to receiving the draw call, GPU 12 executes the first set of commands for rendering the 10 primitives. Input assembler stage 38 assembles the primitives, and as input assembler stage 38 completes assembling a primitive, vertex shader stage 40 executes instantiations of a vertex shader to process the vertices of the primitive. Rasterizer stage 42 receives the vertices and processes on a pixel tile basis.

Because rasterization and pixel shading may take an unknown about of time, and tends to take longer than vertex shading, in some examples, there may be a difference of a few primitives between the primitive that rasterizer stage 42 is processing and the primitive on which vertex shader stage 40 is operating. For example, of the 10 primitives, vertex shader stage 40 may be processing primitive 8 while rasterizer stage 42 is operating on a pixel tile of primitive 5.

Assume that while vertex shader stage 40 is processing primitive 8 and rasterizer stage 42 is operating on a pixel tile of a plurality of pixel tiles of primitive 5 that controller 32 receives the preemption notification. Controller 32 then opens switch S2 and closes switch S1. In this case, primitives 1-4 are rendered and their pixel values are stored in system memory 10. All of the intermediate data that vertex shader stage 40 generated for primitives 5-8 are streamed out from local memory 14 to system memory 10 via stream out unit 41. Rasterizer stage 42 completes the processing of the pixel tile of primitive 5 that rasterizer stage 42 was processing when GPU 12 received the preemption notification. Pixel shader stage 44 and output merge stage 46 preform respective processes on the pixel tile of primitive 5. Controller 32 stops issuing any of the first set of commands to any of the stages of the graphics pipeline of GPU 12.

For primitives 9 and 10, controller 32 stores their context values so that input assembler stage 38 can assemble these primitives after GPU 12 completes executing the second set of commands for which the first set of commands were preempted. Controller 32 may also store information indicating which pixel tile rasterizer stage 42 was processing so that controller 32 can cause stream out unit 41 to retrieve the next pixel tile of primitive 5 when GPU 12 executes the remaining commands of the first set of commands.

As described above, controller 32 dynamically configures the graphics pipeline of GPU 12 to selectively output intermediate data generated by the geometry pipeline to external memory (e.g., system memory 10). As described below, some techniques set, prior to execution of commands, whether GPU 12 was to output the intermediate data to system memory 10 or keep the intermediate data stored in local memory. By dynamically connecting (e.g., during runtime) stream out unit 41 to local memory 14, controller 32 configures during execution of the first set of command the graphics pipeline allowing for the techniques described in this disclosure allow to perform preemption between draw call boundaries with pixel tile level granularity.

Figure 5:
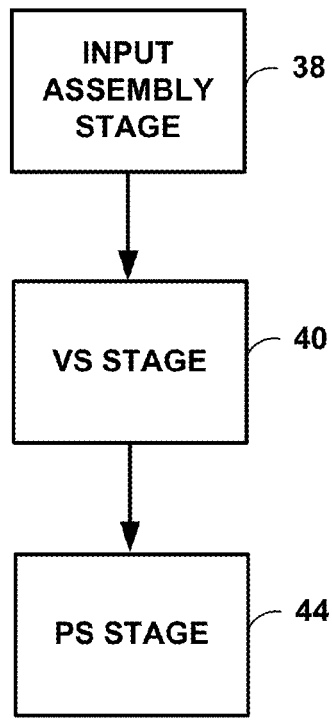
FIG. 5 is a block diagram illustrating another example of a graphics pipeline.

FIG. 5 is a block diagram illustrating another example of a graphics pipeline. The graphics pipeline of FIG. 5 is an example of a graphics pipeline of, for example, DX9/Open GL 3.x API. For instance, FIG. 5 illustrates input assembly stage 38, vertex shader (VS) stage 40, and pixel shader (PS) stage 44. A rasterizer, like rasterizer stage 42, is not illustrated for ease.

Input assembly 48 receives graphics data, such as coordinates of primitives, and constructs a plurality of primitives (e.g., triangles). Vertex shader stage 40 performs operations on the vertices of the primitives. Vertex shader stage 40 may output (e.g., deposit) post-transform vertex attributes in a vertex parameter memory (VPM), sometimes referred to as a vertex parameter cache (VPC). In this example, the post-transform vertex attributes are the intermediate data the vertex shader stage 40 generated. The VPM may be part of GPU local memory 14 (e.g., on-chip memory of GPU 12 where GPU 12 does not need bus 20 to access). Pixel shader stage 44 receives for processing (e.g., consumes) post-transform vertex attributes from the VPM.

Figure 6:
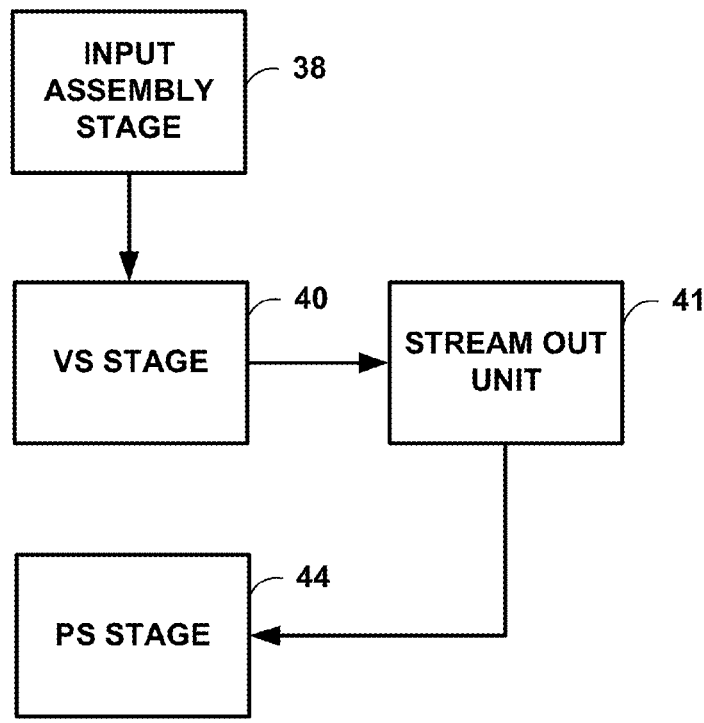
FIG. 6 is a block diagram illustrating another example of a graphics pipeline.

FIG. 6 is a block diagram illustrating another example of a graphics pipeline. The graphics pipeline of FIG. 6 is an example of, for example, a graphics pipeline of DX10/11/Open GL. 4.x API. FIG. 6 illustrates input assembly stage 38, vertex shader stage 40, and pixel shader stage 44. As illustrated, in FIG. 6, vertex shader stage 40 may stream out all post-transform vertex attributes to external memory 10. Pixel shader stage 44 is separated and consumes (e.g., receives for processing) post-transform vertex attributes from memory 10.

In the examples illustrated in FIGS. 5 and 6, preemption may occur by storing all state variables and restarting from a particular position. For example, in FIGS. 5 and 6, preemption may occur only at draw call boundaries. With respect to FIGS. 5 and 6, preemption cannot happen unless the pixel/fragment shader stage is complete, which is basically a drawcall boundary.

In the techniques described in the disclosure, GPU 12 may selectively output intermediate data generated from the geometry pipeline to system memory 10 based on preemption. In this sense, GPU 12 may dynamically choose between "DX9" style (e.g., FIG. 5) and "DX11" style (e.g., FIG. 6) vertex output stream out (e.g., the manner in which the vertex information is outputted) based on preemption.

For preemption, GPU 12 uses memory 10 for data storage for primitives in the graphics pipeline, stops pixel (e.g., tile) generation, flushes all vertex stages, but dynamically directs them to memory 10 instead. For example, a stage similar to DX10's streamOut feature (e.g., stream out unit 41) except that it is dynamically decided by GPU 12 to support preemption instead of upfront by user/API. On resume, GPU 12 receives post transform vertex attributes from system memory 10 for processing by rasterizer stage 42.

Figure 7:
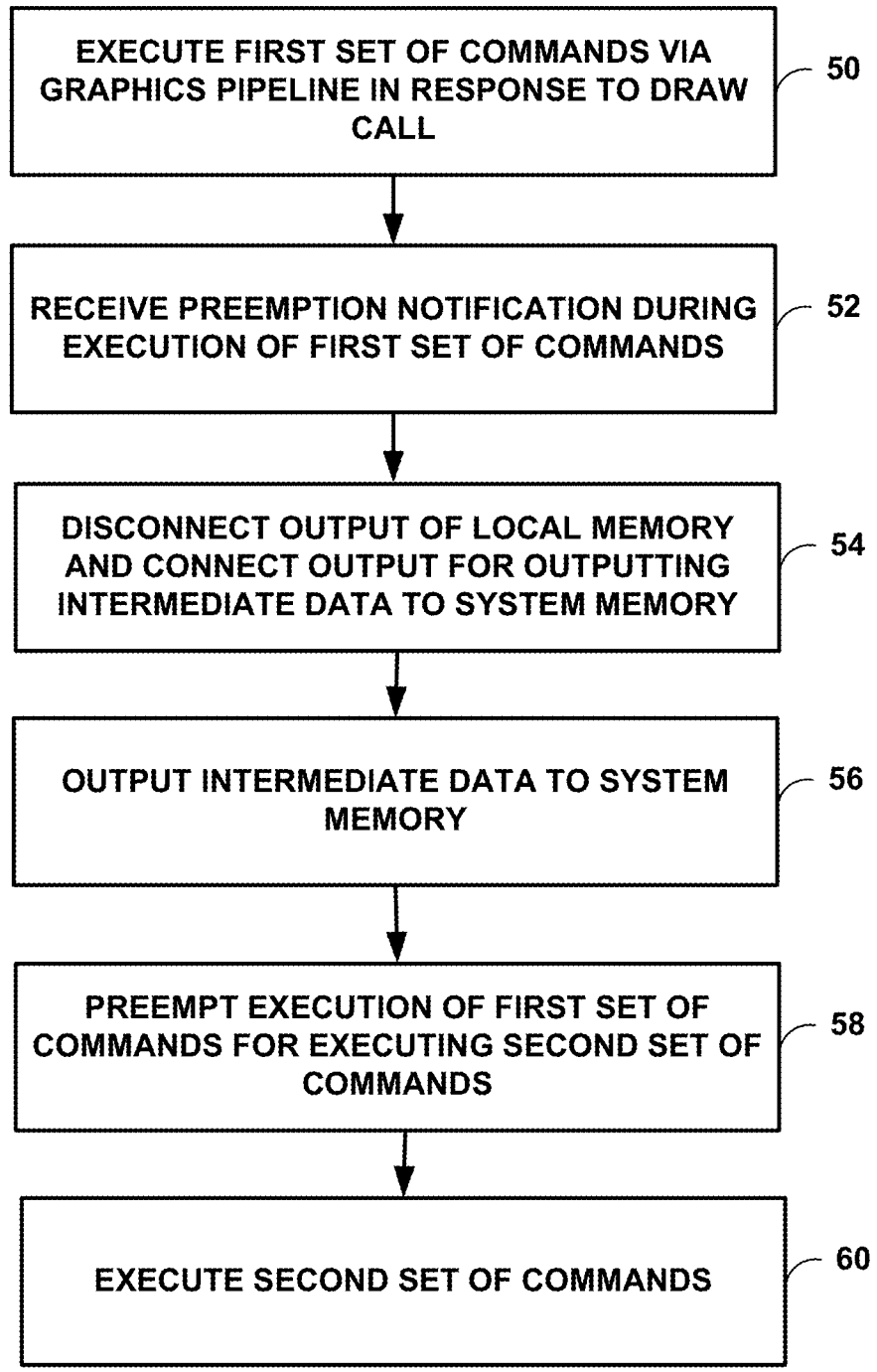
FIG. 7 is a flowchart illustrating an example method of processing data.

FIG. 7 is a flowchart illustrating an example method of processing data. As illustrated, GPU 12 may execute a first set of commands via a graphics pipeline of GPU 12 in response to receiving a draw call (50). The draw call defines one or more primitives that are to be rendered by the first set of commands, and the graphics pipeline is configured to store data generated by stages of the graphics pipeline during the execution of the first set of commands in local memory of GPU 12. GPU 12 receives a preemption notification during execution of the first set of commands and prior to rendering all of the one or more primitives (52).

In response to receiving the preemption notification, GPU 12 may disconnect an output of the local memory of GPU 12 from a stage of the graphics pipeline and connect the output of the local memory of GPU 12 to hardware stream out unit 41 of GPU 12 to dynamically configure interconnection of stages of the graphics pipeline during execution of the first set of commands (54). GPU 12 may output, from stream out unit 41, intermediate data generated during execution of one or more commands of the first set of commands to a memory that is external to the GPU due to dynamic configuration of the interconnection of stages of the graphics pipeline of GPU 12, during execution of the first set of commands (56). For example, controller 32 may disconnect the output of local memory 14 from rasterizer stage 42 and connect the output of local memory 14 to stream out unit 41 for outputting intermediate data generated by the geometry pipeline during execution of one or more commands of the first set of commands to system memory 10 to dynamically configure the graphics pipeline of GPU 12, during execution of the first set of commands, to output the intermediate data to system memory 10.

For example, during normal operation, the stage (e.g., rasterizer stage 42) receives the intermediate data from the local memory for processing by the stage prior to receiving the preemption notification. Then, only in response to receiving the preemption notification, GPU 12, via stream out unit 41, outputs the intermediate data generated by a shader (e.g., vertex shader stage 40) to the memory that is external to GPU 12 (e.g., to system memory 10). Controller 32 then stops execution of the first set of commands for rendering the one or more primitives.

GPU 12 may preempt the execution of the first set of commands, prior to completing the execution of the first set of commands to render the one or more primitives of the draw call, for executing a second set of commands (58). GPU 12 may then execute the second set of commands (60). Subsequent to the execution of the second set of commands, GPU 12 resumes execution of the first set of commands by retrieving, via stream out unit 41 as an example, the intermediate data from the memory that is external to GPU 12 (e.g., system memory 10) for rasterizing by rasterizer stage 42 and pixel shading by pixel shader stage 44.

Because GPU 12 may preempt the execution of the first set of commands, prior to completing the execution of the first set of commands to render the one or more primitives of the draw call, GPU 12 may preempt prior to reaching draw call boundaries. For example, assume that one or more primitives of the draw call include a first set of primitives and a second set of primitives. In this example, preempting includes preempting after rasterizing with rasterizer stage 42 and pixel shading with pixel shader stage 44 a pixel tile and no other subsequent pixel tile (e.g., to provide pixel tile level granularity for preemption). As described, rasterizing and pixel shading comprise functions performed by two stages of the graphics pipeline (e.g., rasterizer stage 42 and pixel shader stage 44, respectively, of the graphics pipeline).

In this example, the pixel tile includes one or more pixels of one or more primitives of the first set of primitives and none of the pixels of the second set of primitives. Therefore, although primitives of the second set of primitives, and even pixel tiles within the first set of primitives may need to be rendered, GPU 12 is capable of preempting after processing of a pixel tile, rather than waiting for a draw call boundary or storing a vast amount of context values.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Various aspects and examples have been described. However, modifications can be made to the structure or techniques of this disclosure without departing from the scope of the following claims.

What is claimed is:

1. A method of processing data, the method comprising:
   executing, with a graphics processing unit (GPU), a first set of commands via a graphics pipeline of the GPU in response to receiving a draw call, the draw call defining one or more primitives that are to be rendered by execution of the first set of commands;
   receiving, with the GPU, a preemption notification during execution of the first set of commands and prior to rendering all of the one or more primitives;
   in response to receiving the preemption notification, disconnecting, with at least a first hardware switch, an output of a local memory of the GPU from a stage of the graphics pipeline and connecting, with at least a second hardware switch, the output of the local memory of the GPU to a hardware stream out unit of the GPU to dynamically configure interconnection of stages of the graphics pipeline during execution of the first set of commands, wherein the hardware stream out unit is coupled to a memory that is external to the GPU;
   outputting, from the hardware stream out unit, intermediate data generated during execution of one or more commands of the first set of commands to the memory that is external to the GPU due to the dynamic configuration of the interconnection of stages of the graphics pipeline of the GPU, during execution of the first set of commands;
   preempting, with the GPU, the execution of the first set of commands, prior to completing the execution of the first set of commands to render the one or more primitives of the draw call, for executing a second set of commands; and
   executing the second set of commands.

2. The method of claim 1, wherein the one or more primitives comprise a first set of primitives and a second set of primitives, wherein preempting comprises preempting after rasterizing and pixel shading a pixel tile and no other subsequent pixel tile, the pixel tile comprising one or more pixels of one or more primitives of the first set of primitives and none of the pixels of the second set of primitives, and wherein rasterizing and pixel shading comprise functions performed by two stages of the graphics pipeline.

3. The method of claim 1, wherein preempting comprises preempting prior to reaching draw call boundaries.

4. The method of claim 1, wherein disconnecting the output of the local memory of the GPU from the stage of the graphics pipeline comprises:
disconnecting the output of the local memory of the GPU from a rasterizer stage.

5. The method of claim 1, further comprising:
only in response to receiving the preemption notification, outputting the intermediate data generated by a shader to the memory that is external to the GPU; and
stopping execution of the first set of commands for rendering the one or more primitives.

6. The method of claim 1, further comprising:
subsequent to execution of the second set of commands, resuming execution of the first set of commands by retrieving the intermediate data from the memory that is external to the GPU for rasterizing and pixel shading.

7. The method of claim 1, further comprising:
receiving, with the stage, the intermediate data from the local memory for processing by the stage prior to receiving the preemption notification.

8. A device for processing data, the device comprising:
a system memory; and
a graphics processing unit (GPU), the GPU comprising at least a first hardware switch, at least a second hardware switch, a hardware stream output unit, and a local memory, wherein the GPU is configured to:
execute a first set of commands via a graphics pipeline of the GPU in response to receiving a draw call, the draw call defining one or more primitives that are to be rendered by execution of the first set of commands;
receive a preemption notification during execution of the first set of commands and prior to rendering all of the one or more primitives;
in response to receiving the preemption notification, disconnect, with at least the first hardware switch, an output of the local memory of the GPU from a stage of the graphics pipeline and connect, with at least the second hardware switch, the output of the local memory of the GPU to the hardware stream out unit of the GPU to dynamically configure interconnection of stages of the graphics pipeline during execution of the first set of commands, wherein the hardware stream out unit is coupled to the system memory that is external to the GPU;
output, from the hardware stream out unit, intermediate data generated during execution of one or more commands of the first set of commands to the system memory that is external to the GPU due to the dynamic configuration of the interconnection of stages of the graphics pipeline of the GPU, during execution of the first set of commands;
preempt the execution of the first set of commands, prior to completing the execution of the first set of commands to render the one or more primitives of the draw call, for executing a second set of commands; and
execute the second set of commands.

9. The device of claim 8, wherein the graphics pipeline comprises a rasterizer stage and a pixel shader stage, wherein the one or more primitives comprise a first set of primitives and a second set of primitives, and wherein the GPU is configured to preempt after rasterizing with the rasterizer stage and pixel shading with the pixel shader stage a pixel tile and no other subsequent pixel tile, the pixel tile comprising one or more pixels of one or more primitives of the first set of primitives and none of the pixels of the second set of primitives.

10. The device of claim 8, wherein the GPU is configured to preempt prior to reaching draw call boundaries.

11. The device of claim 8, wherein to disconnect the output of the local memory of the GPU from the stage of the graphics pipeline, the GPU is configured to disconnect the output of the local memory of the GPU from a rasterizer stage.

12. The device of claim 8, wherein the GPU is configured to:
output the intermediate data generated by a shader to the system memory that is external to the GPU, only in response to receiving the preemption notification; and
stop execution of the first set of commands for rendering the one or more primitives.

13. The device of claim 8, wherein the GPU is configured to:
resume execution of the first set of commands by retrieving the intermediate data from the system memory that is external to the GPU for rasterizing and pixel shading, subsequent to execution of the second set of commands.

14. The device of claim 8, wherein the stage is configured to receive the intermediate data from the local memory for processing by the stage prior to receiving the preemption notification.

15. The device of claim 8, wherein the device comprises a wireless communication device.

16. A non-transitory computer-readable storage medium having instructions stored thereon that when executed cause a graphics processing unit (GPU) of a device for processing data to:
execute a first set of commands via a graphics pipeline of the GPU in response to receiving a draw call, the draw call defining one or more primitives that are to be rendered by execution of the first set of commands;
receive a preemption notification during execution of the first set of commands and prior to rendering all of the one or more primitives;
in response to receiving the preemption notification, disconnect, with at least a first hardware switch, an output of a local memory of the GPU from a stage of the graphics pipeline and connect, with at least a second hardware switch, the output of the local memory of the GPU to a hardware stream out unit of the GPU to dynamically configure interconnection of stages of the graphics pipeline during execution of the first set of commands, wherein the hardware stream out unit is coupled to a memory that is external to the GPU;
output, from the hardware stream out unit, intermediate data generated during execution of one or more commands of the first set of commands to the memory that is external to the GPU due to the dynamic configuration of the interconnection of stages of the graphics pipeline of the GPU, during execution of the first set of commands;
preempt the execution of the first set of commands, prior to completing the execution of the first set of commands to render the one or more primitives of the draw call, for executing a second set of commands; and
execute the second set of commands.

17. The computer-readable storage medium of claim 16, wherein the one or more primitives comprise a first set of primitives and a second set of primitives, and wherein the instructions that cause the GPU to preempt comprise instructions that cause the GPU to preempt after rasterizing and pixel shading a pixel tile and no other subsequent pixel tile, the pixel tile comprising one or more pixels of one or more primitives of the first set of primitives and none of the pixels of the second set of primitives, and wherein rasterizing and pixel shading comprise functions performed by two stages of the graphics pipeline.

18. The computer-readable storage medium of claim 16, wherein the instructions that cause the GPU to preempt comprise instructions that cause the GPU to preempt prior to reaching draw call boundaries.

19. The computer-readable storage medium of claim 16, wherein the instructions that cause the GPU to disconnect the output of the local memory of the GPU from the stage of the graphics pipeline comprises:
  instructions that cause the GPU to disconnect the output of the local memory of the GPU from a rasterizer stage.

20. The computer-readable storage medium of claim 16, further comprising instructions that cause the GPU to:
  output the intermediate data generated by a shader to the memory that is external to the GPU only in response to receiving the preemption notification; and
  stop execution of the first set of commands for rendering the one or more primitives.

21. A device for processing data, the device comprising:
  means for executing a first set of commands via a graphics pipeline of a graphics processing unit (GPU) in response to receiving a draw call, the draw call defining one or more primitives that are to be rendered by execution of the first set of commands;
  means for receiving a preemption notification during execution of the first set of commands and prior to rendering all of the one or more primitives;
  at least a first hardware switch configured to disconnect an output of a local memory of the GPU from a stage of the graphics pipeline;
  at least a second hardware switch configured to connect the output of the local memory of the GPU to a hardware stream out unit of the GPU to dynamically configure the interconnection of stages of the graphics pipeline during execution of the first set of commands, wherein the hardware stream out unit is coupled to a memory that is external to the GPU;
  means for outputting, from the hardware stream out unit, intermediate data generated during execution of one or more commands of the first set of commands to the memory that is external to the GPU due to the dynamic configuration of the interconnection of stages of the graphics pipeline of the GPU, during execution of the first set of commands;
  means for preempting the execution of the first set of commands, prior to completing the execution of the first set of commands to render the one or more primitives of the draw call, for executing a second set of commands; and
  means for executing the second set of commands.

22. The device of claim 21, wherein the one or more primitives comprise a first set of primitives and a second set of primitives, wherein the means for preempting comprises means for preempting after rasterizing and pixel shading a pixel tile and no other subsequent pixel tile, the pixel tile comprising one or more pixels of one or more primitives of the first set of primitives and none of the pixels of the second set of primitives, and wherein rasterizing and pixel shading comprise functions performed by two stages of the graphics pipeline.

23. The device of claim 21, wherein the means for preempting comprises means for preempting prior to reaching draw call boundaries.

24. The device of claim 21, wherein the at least one first hardware switch is configured to disconnect the output of the local memory of the GPU from a rasterizer stage.

25. The device of claim 21, further comprising:
  means for outputting the intermediate data generated by a shader to the memory that is external to the GPU only in response to receiving the preemption notification; and
  means for stopping execution of the first set of commands for rendering the one or more primitives.

* * * * *